(12) United States Patent
Ochsenknecht et al.

(10) Patent No.: US 7,168,545 B2
(45) Date of Patent: Jan. 30, 2007

(54) COUPLING

(75) Inventors: Daniel Ochsenknecht, Hennef (DE); Heinz Ossendorf, Lohmar (DE); Gottfried Kohnen, Köln (DE); Andreas Sarfert, Bonn (DE)

(73) Assignee: GKN Walterscheid GmbH (DE)

( * ) Notice: Subject to any disclaimer, the term of this patent is extended or adjusted under 35 U.S.C. 154(b) by 139 days.

(21) Appl. No.: 10/982,460

(22) Filed: Nov. 5, 2004

(65) Prior Publication Data
US 2005/0115789 A1 Jun. 2, 2005

(30) Foreign Application Priority Data
Nov. 6, 2003 (DE) .............................. 103 52 320

(51) Int. Cl.
*F16D 25/063* (2006.01)
(52) U.S. Cl. .............................. 192/109 F; 192/114 R
(58) Field of Classification Search .............. 192/66.31
See application file for complete search history.

(56) References Cited

U.S. PATENT DOCUMENTS

| | | | | |
|---|---|---|---|---|
| 2,876,743 A | * | 3/1959 | Maki ..................... | 192/85 AA |
| 3,306,407 A | * | 2/1967 | Smirl .................... | 192/85 AA |
| 3,307,430 A | * | 3/1967 | Bauder .................. | 192/109 F |
| 4,662,499 A | * | 5/1987 | Jordan ................... | 192/82 T |
| 4,934,502 A | * | 6/1990 | Horsch .................. | 192/85 AA |
| 5,090,539 A | * | 2/1992 | Wolf et al. ............. | 192/85 AA |
| 2003/0089573 A1 | | 5/2003 | Ackermann | |
| 2003/0234149 A1 | * | 12/2003 | Peterseim et al. ......... | 192/52.6 |

FOREIGN PATENT DOCUMENTS

| | | |
|---|---|---|
| DE | 25 40 191 C3 | 8/1981 |
| DE | 3425346 A1 | 1/1986 |
| DE | 299 04 108 U1 | 8/1999 |
| FR | 2 567 975 | 1/1986 |
| GB | 2 347 719 A | 9/2000 |

* cited by examiner

*Primary Examiner*—Rodney H. Bonck
(74) *Attorney, Agent, or Firm*—Harness, Dickey & Pierce, P.L.C.

(57) ABSTRACT

A coupling, used in drivelines or for driving agricultural implements, has a first coupling element (1) and a second coupling element (2). An actuating element (4) is axially displaceable relative to the first coupling element (1) between a switched-on position and a switched-off position. A power drive (5) actively displaces the actuating element (4). The power drive (5) loads the actuating element (4) in the switched-on position against an abutment mechanism (31, 36). A first spring (6), in the switched-on position of the actuating element (4), loads the friction assembly (3). This enables the friction assembly (3) to assume the torque transmitting position.

14 Claims, 5 Drawing Sheets

COUPLING

CROSS-REFERENCE TO RELATED APPLICATIONS

This application claims priority to German Patent Application No. 10352320.0, filed Nov. 6, 2003, which application is herein expressly incorporated by reference.

FIELD OF THE INVENTION

The invention relates to a coupling used in drivelines or for driving agricultural implements. The coupling has a first coupling element and a second coupling element which are rotatable relative to one another around an axis of rotation. The coupling includes a friction assembly to transmit torque between the first coupling element and the second coupling element. The friction assembly can be transferred into a torque transmitting position by an actuating element. A power drive is provided to adjust the actuating element.

BACKGROUND OF THE INVENTION

A coupling is shown in DE 25 40 191 C3. The coupling includes a power drive in the form of a double-acting hydraulic cylinder with a circular-ring-shaped cylinder chamber. An actuating element, in the form of a disc, is axially adjustable by the hydraulic cylinder. When the actuating element is in position so that the friction assembly is transferred into its torque transmitting position, a plate spring is pretensioned between the friction assembly and the actuating element. A hydraulic pulse is released to transfer the actuating element into the switched-on position. After the switched-on position has been reached, the hydraulic pressure in the hydraulic cylinder drops. The actuating element is held in the switched-on position by an engaging device. The coupling is opened in the opposite direction by loading the double-acting hydraulic cylinder. However, a disadvantage is that, when the actuating element is transferred towards the switched-on position by the hydraulic cylinder, the hydraulic cylinder moves the actuating element beyond the switched-on position in the direction of the friction assembly. Thus, only after the hydraulic pressure has dropped, is the final switched-on position reached while a predetermined torque of the friction assembly is set. Furthermore, the coupling cannot be used in applications where the coupling has to be switched off when the pressure in the hydraulic system drops. Furthermore, the circular-ring-shaped cylinder chamber requires a high pressure to be able to displace the actuating element.

SUMMARY OF THE INVENTION

It is an object of the present invention to provide a coupling of the initially mentioned type where the transferable torque of the friction assembly is independent of the switching force of the power drive. Further, the friction assembly is released if the switching force drops.

In accordance with the invention, a coupling, preferably used in drivelines or for driving agricultural implements, comprises a first coupling element and a second coupling element. The coupling elements are arranged to be rotatable relative to one another around an axis of rotation. A friction assembly can be loaded to assure a transmitting position torque, in order to transmit torque from one of the first and second coupling elements to the other coupling element. An actuating element is axially displaceable relative to the first coupling element between a switched-on position and a switched off position. In the switched-on position, the friction assembly is loaded to assume the torque transmitting position. A power drive displaces the actuating element. The power drive loads the actuating element in the switched-on position with a force against an abutment mechanism to delimit the displacement path of the actuating element. The power drive holds the actuating element in the switched-on position. When the actuating element is moved to the switched-on position, a first spring loads the friction assembly with a force to enable the friction assembly to assume the torque transmitting position. The first spring is pretensioned by the actuating element by a pretensioned path defined by the switched-on, position of the actuating element.

In the switched-on position of the actuating element, the actuating element is force-loaded by the power drive and held in the switched-on position. Thus, when the pressure drops, the actuating element is released and the friction assembly no longer transfers any torque. In the switched-on position of the actuating element, the actuating element is loaded by the power drive against an abutment mechanism. Thus, a defined pretension of the first spring is achieved. Accordingly, the friction assembly is loaded by a predetermined force towards the torque transmitting position. As a result, a defined maximum friction moment is achieved.

In the switched-on position of the actuating element, the first spring can be supported against the actuating element and against the friction assembly. The first spring can also be supported between the first coupling element and the friction assembly.

The power drive is preferably a hydraulically acting switching unit with a first switching element and a second switching element. The first switching element forms part of the actuating element. The first switching element and the second switching element jointly form a pressure chamber. The second switching element is firmly connected to the first switching element and forms a unit. The first switching element can be in the form of a piston and the second switching element in the form of a cylinder.

In a preferred embodiment, the pressure chamber is centrally arranged relative to the axis of rotation. Thus, a larger pressure face is achieved at the piston relative to the circular-ring-shaped cylinder chambers. As a result, higher forces can be achieved even with lower hydraulic pressures.

The second switching element is preferably in the form of a cover. The first switching element is adjustably guided in the form of a piston. The cover includes a central connection for the pressure agent supply mechanism. It is due to this simple design that the switching unit, with respect to the radius, can easily be adapted to special applications. As a result, the piston face is variable. Thus, it is possible for the piston face to be adaptable to predetermined hydraulic system pressures in order to be able to achieve certain switching forces.

The abutment can be adjustable so that the switched-on position of the actuating element and thus the pretensioned path of the first spring can be varied. The abutment can be in the form of pins which extend parallel to the axis of rotation. The pins, by a first end, are connected to the actuating element. In the switched-on position of the actuating element, by a second end, the pins are axially supported at least indirectly against the first coupling element. In order to vary the axial position of the switched-on position, it is possible to provide nuts which are threaded onto a thread at the second end of the pin. Via the nuts, the pins are supported against the first coupling element.

Furthermore, a returning mechanism may be provided to load the actuating element towards assuming the switched-off position. More particularly, this may be necessary in the case of hydraulic power drives even if, in the case of a power drive loaded by non-hydraulic mechanism, there always exists a slight hydraulic pressure which is able to displace the actuating element from the switched-off position, over part of the path, to the switched-on position. The returning mechanism holds the actuating element in the switched-off position.

According to a preferred embodiment, the returning mechanism is provided in the form of pins which extend parallel to the axis of rotation. A first end of the pins is connected to the actuating element. The pins, in the switched-on position of the actuating element, by a second end, are axially supported via a second spring against the first coupling element. The returning mechanism can, at the same time, constitute the abutment mechanism, which results in a simple design.

In a preferred embodiment, the first coupling element is in the form of a coupling sleeve and the second coupling element is in the form of a coupling hub. The friction assembly includes first plates which are supported against the first coupling element in a rotationally fast way or are connected thereto in a rotationally fast way. Second plates are supported in a rotationally fast way against the second coupling element or connected thereto in a rotationally fast way.

In order to enable a shorter spring travel, the first spring is in the form of at least one plate spring. In addition, the plate springs include a flat characteristic curve. Thus, even if the friction assembly is subject to a small amount of wear combined with a change in the pretensioned path of the plate spring, it is possible to achieve approximately the same pretensioning force as in the condition involving no wear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
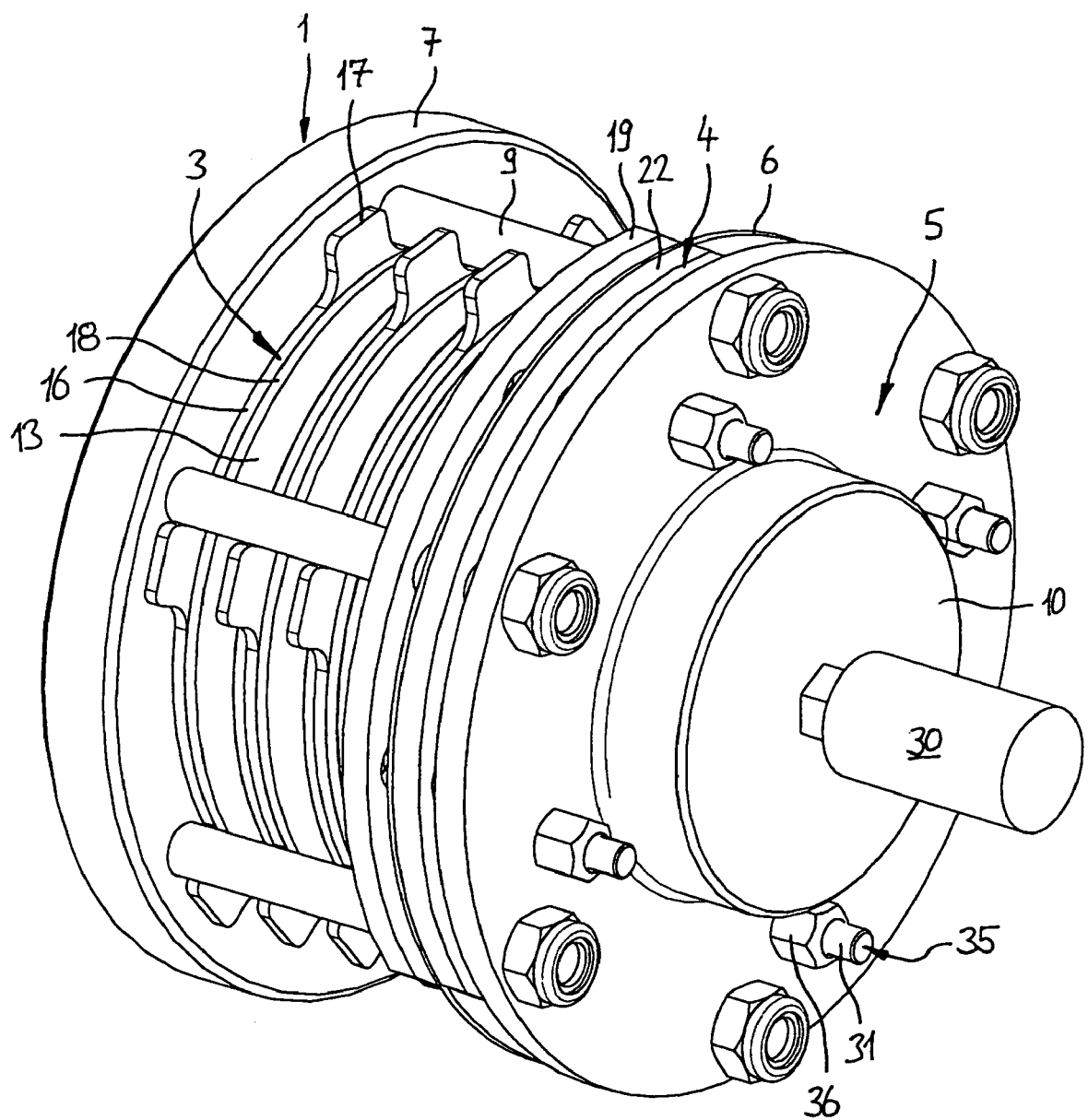
FIG. 1 is a perspective view of a first embodiment of an inventive coupling.
Figure 2:
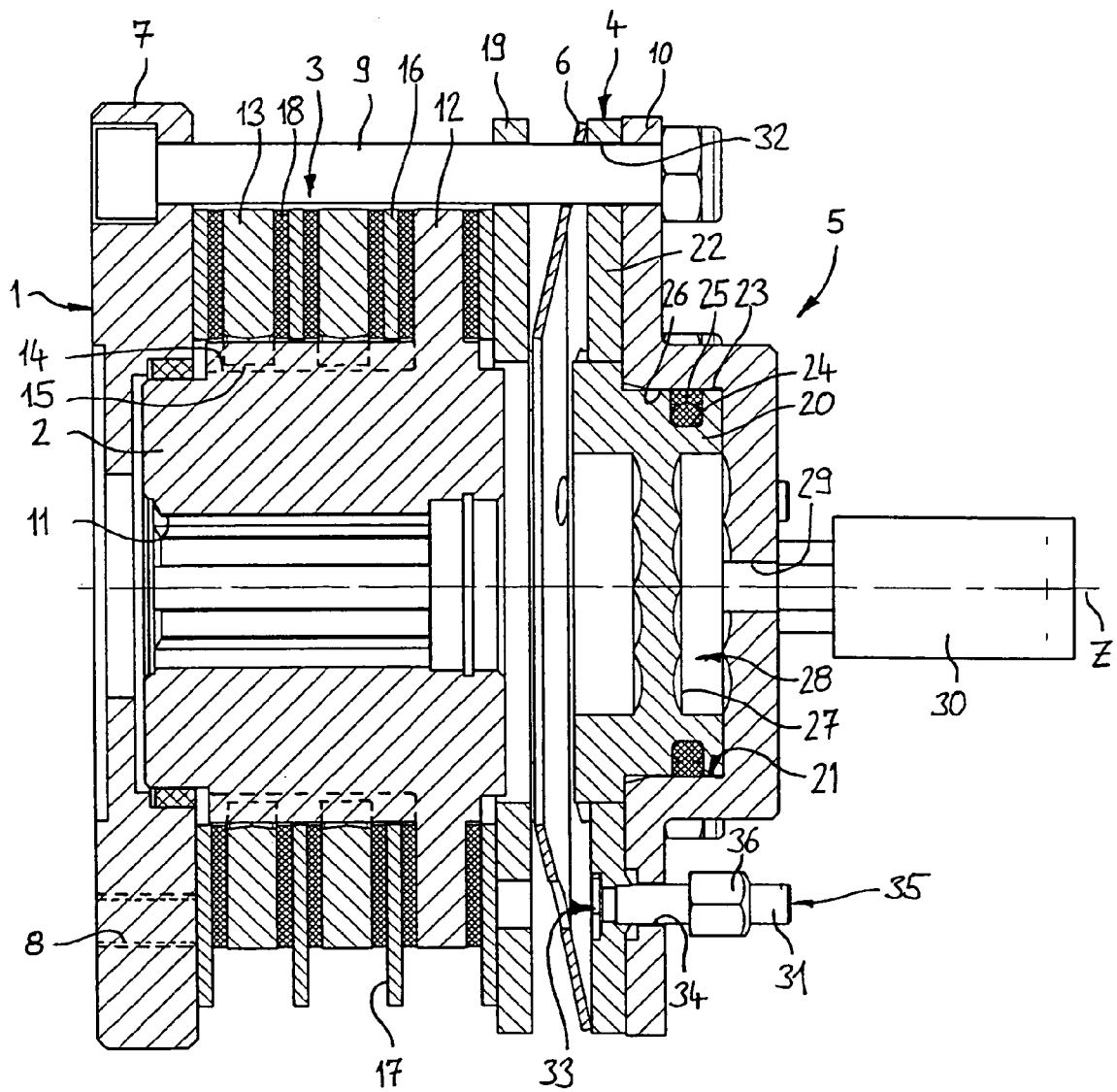
FIG. 2 is a longitudinal section view through the coupling according to FIG. 1 in a switched-off condition.
Figure 3:
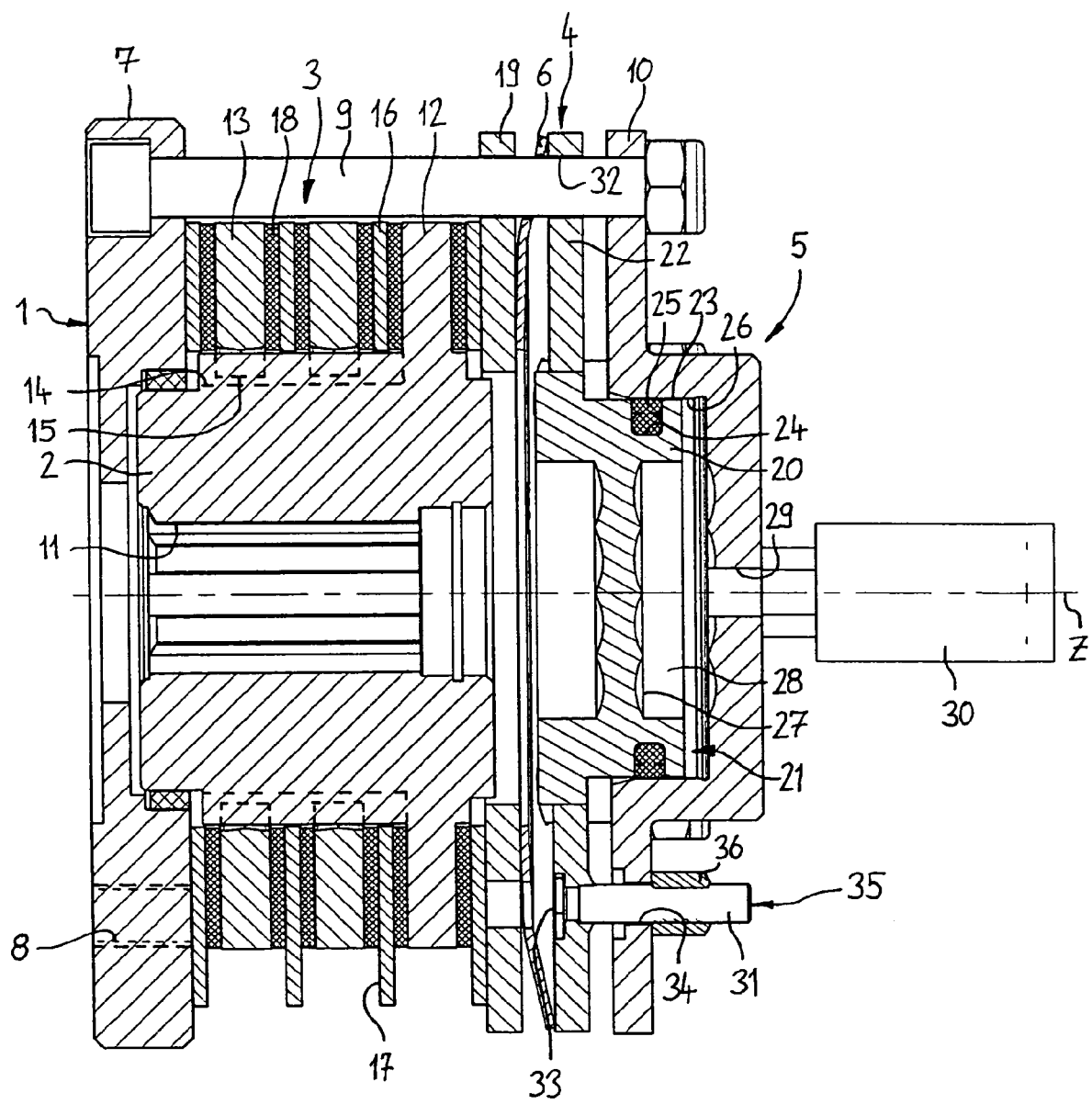
FIG. 3 is a longitudinal section through a coupling according to FIG. 1 in a switched-on condition.

FIGS. 1 to 3 refer to the same embodiment and will therefore be described jointly. They show a first coupling element in the form of a coupling sleeve 1 and a second coupling element in the form of a coupling hub 2. The coupling sleeve 1 is arranged around the coupling hub 2. The two coupling elements 1, 2 are arranged so as to be rotatable around an axis of rotation Z. A friction assembly 3 is provided to transmit torque between the coupling sleeve 1 and the coupling hub 2. The friction assembly 3 is actuated by an actuating element 4. The actuating element 4, relative to the coupling sleeve 1 and the coupling hub 2, is axially displaceable between a switched-on position and a switched-off position. In the switched-on position, the friction assembly 3 is loaded towards assuming a torque transmitting position where torque can be transmitted between the coupling sleeve 1 and the coupling hub 2. Furthermore, a power drive in the form of a hydraulic switching unit, axially displaces the actuating element 4. A first spring is positioned between the actuating element 4 and the friction assembly 3. The first spring is in the form of a plate spring 6. Thus, when the actuating element 4 is set, the friction assembly 3 is force-loaded by the pretensioning force of the plate spring 6.

The coupling sleeve 1 includes an attaching flange 7, a plurality of connecting pins 9 as well as a cylinder 10. The attaching flange 7 includes threaded bores 8 enabling connection of a driving component of a driveline. The connecting pins 9, at one of their ends, are connected to the attaching flange 7 and extend parallel to the axis of rotation Z. At their ends facing away the attaching flange, the connecting pins 9 are connected to the cylinder 10. The cylinder 10 thus forms part of the coupling sleeve 1 and of the hydraulic switching unit 5.

The coupling hub 2 includes a central bore 11 which is coaxially arranged relative to the axis of rotation Z. The central bore 11 includes longitudinal teeth which connect the coupling hub 2 to an output part of the driveline. The coupling hub 2 has a first inner plate 12. The inner plate 12 has a circular-ring-shape and is arranged around the axis of rotation Z. Second inner plates 13 are arranged on the coupling hub 2. The second inner plates 13 are axially displaceable relative to the first inner plate 12. The coupling hub, on part of its outer circumference, includes longitudinal grooves 14 which enable the second inner plates 13 to slide, in a rotationally fast way, by correspondingly shaped bores 15. Thus, it is possible for the second inner plates 13 to be rotated together with the coupling hub 2 and be axially displaced relative to the coupling hub 2. The first inner plates 12 and the second inner plates 13 form a set of first plates.

Substantially circular-ring-shaped second plates are provided in the form of outer plates 16. The outer plates 16 include radially outwardly extending supporting portions 17 supporting the outer plates 16 in the direction of rotation against the connecting pins 9. Thus, the outer plates 16 are held in a rotationally fast way relative to the coupling sleeve 1. The outer plates 16 are arranged to be axially displaceable relative to the coupling sleeve 1. The outer plates 16 are arranged to alternate in the axial direction with the inner plates 12, 13. Friction linings 18 are between the plates 12, 13, 16 and fixed to the outer plates 16.

The plates 12, 13, 16 are axially supported in one direction against the attaching flange 7. A pressure plate is provided on the side facing away from the attaching flange 7. The pressure plate 19 can be pressure-loaded against the plates 12, 13, 16 towards the attaching flange 7 to assume a torque transmitting position. Accordingly, the plates 12, 13, 16 are pressed against one another to ensure a torque transmission between the coupling sleeve 1 and the coupling hub 2. The plates 12, 13, 16 and the pressure plate 19 form part of the friction assembly 3.

The hydraulic switching unit 5 includes a first switching element in the form of a piston 20. A second switching element is in the form of a cylinder 10. The cylinder 10 is connected to and held rigidly relative to the attaching flange 7. Furthermore, the cylinder 10 includes a cylinder chamber 21 which is coaxially arranged relative to the axis of rotation Z. The piston 20, via a cylindrical outer face 23, is axially adjustably guided in the cylinder chamber 21 of the cylinder 10. A circumferential groove 24 is provided in the outer face 23. The grooves 24 holds a sealing ring 25 which is in sealing contact with an inner circumferential face 26 of the cylinder chamber 21.

The piston 20 includes a pressure face 27. The pressure face 27 faces the cylinder 10 and delimits a pressure chamber 28 in the cylinder chamber 21. By loading the pressure chamber 28 with a hydraulic fluid, the piston 20 is displaced towards the friction assembly 3.

A central through-bore 29 is provided in the cylinder 10. The central through-bores 29 extends coaxially relative to the axis of rotation Z. Via the through-bore 29, a rotary feedthrough passage 30 for hydraulic fluid is connected to the cylinder chamber 21 and also to the pressure chamber 28. By means of the rotary feedthrough passage 30 the pressure chamber 28 can be connected to a hydraulic pressure source.

The fixing element 4 includes the piston 20 and the pressure disc 22 which is firmly connected to the piston 20. The pressure disc 22 has bores 32. The connecting pins 9 pass through the bores 32 so that the piston 20 is arranged to be rotationally fast and axially displaceable relative to the coupling sleeve 1. The actuating element 4 is axially moved, via the piston 20, between the switched-off position, shown in FIG. 2, and the switched-on position, shown in FIG. 3. In the switched-on position, the actuating element 4 is axially supported against an abutment mechanism so that it cannot be axially moved beyond the switched-on position.

The abutment mechanism is formed by pins 31. At a first end 33, the pins 31 are connected to the pressure disc 22. The pins 31 pass through bores 34 of the cylinder 10. The pins second end 35 includes threads which receive screw nuts 36. In the switched-on position of the actuating element 4, the nuts 36 are supported against the cylinder 10 on the side of the cylinder 10 which faces away from the friction assembly 3. Furthermore, in the switched-on position, the plate spring 6 is pretensioned, with the pretensioned path of the plate spring 6 being delimited by the abutment mechanism. The friction assembly 3 is thus loaded by the spring force of the plate spring 6. The spring force depends on the pretensioned path of the plate spring 6, with the pretensioned path, in return, being defined by the abutment mechanism. By adjusting the nut 36, it is possible to vary the pretension of the plate springs 6 and to set a maximum transmissible torque of the coupling and friction assembly 3, respectively. Accordingly, the abutment mechanism ensures that the force applied to the friction assembly 3 is independent of the hydraulic pressure of the hydraulic switching unit 5 and of the force generated by the piston 20.

Figure 4:
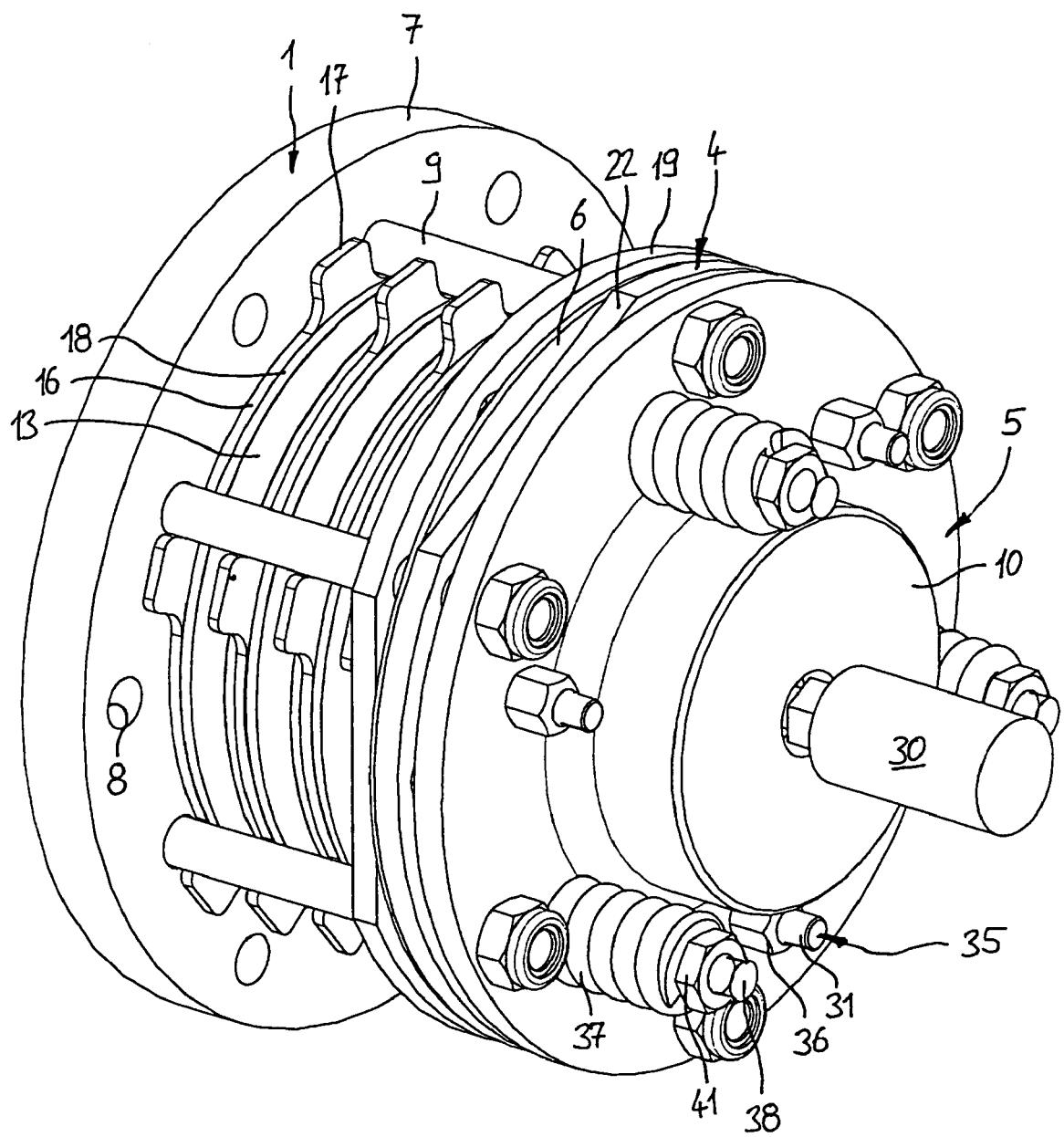
FIG. 4 is a perspective illustration of a second embodiment of an inventive coupling.
Figure 5:
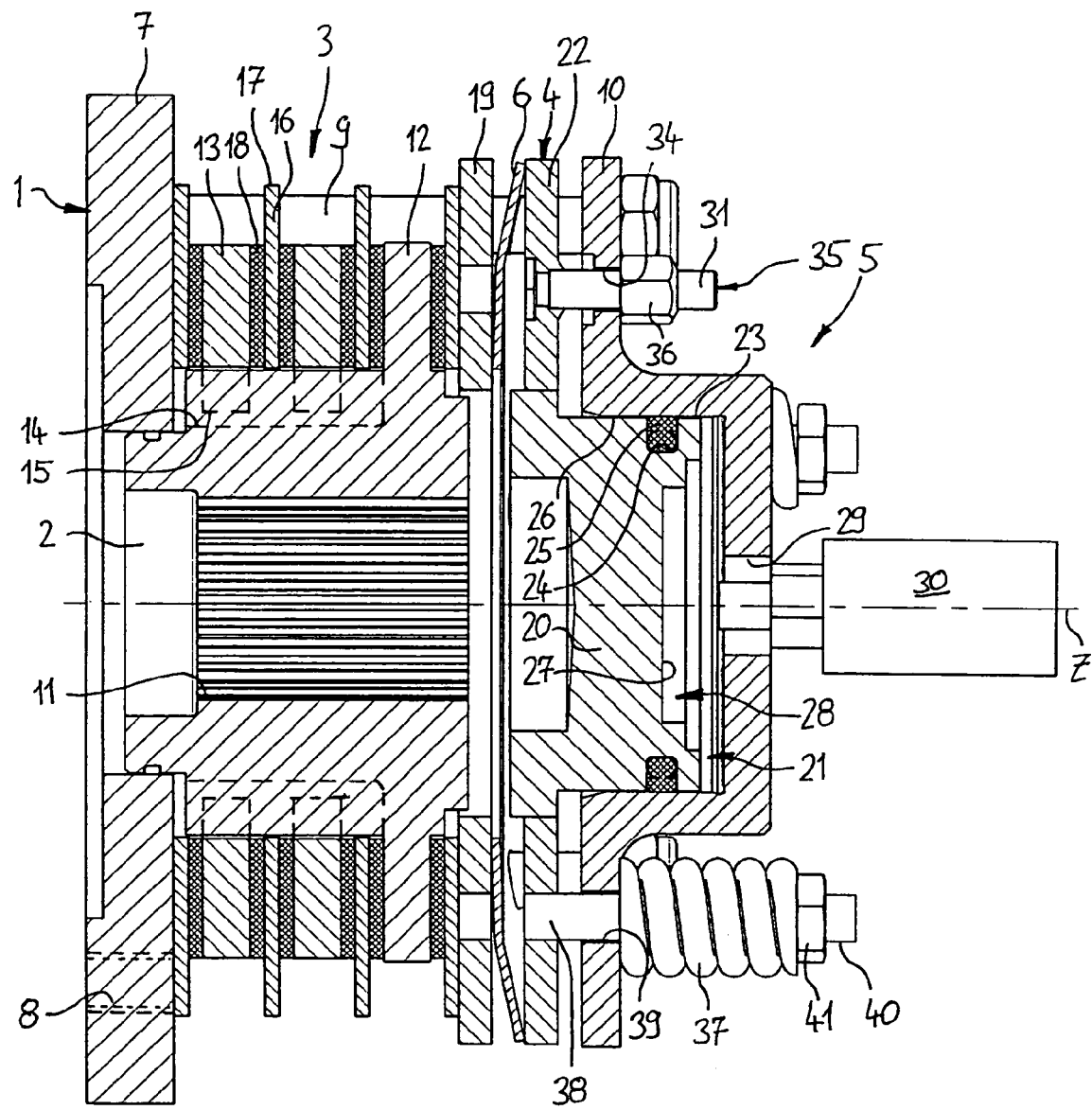
FIG. 5 is a longitudinal section through the coupling according to FIG. 4.

However, when connecting the hydraulic switching unit 5 to the hydraulic systems of existing implements or machinery, it is possible that, when disconnecting the coupling, when lowering the hydraulic pressure, a slight hydraulic pressure continues to exist. As a result, the actuating element 4 would continue to slightly pretension the plate spring 6. Thus, the friction assembly 3 would be slightly force-loaded. In order to prevent the friction assembly 3 from being loaded in this way, the embodiment, according to FIGS. 4 and 5 provided with second springs in the form of pressure springs 37. The pressure springs 37 load the actuating element 4 into assuming the switched-off position. Pins 38 extend parallel to the axis of rotation Z from the pressure disc 22. The pins 38 pass through bores 39 in the cylinder 10. On the side of the cylinder 10 facing away from the actuating element 4, the pins 38 include threads 40. Threaded nuts 41 are threaded onto the pins 38. The pressure springs 37 are positioned between the cylinder 10 and the nuts 41. Thus, the actuating element 4 is loaded towards assuming the switched-off position.

The second springs and pressure springs 37 can also be arranged around the first pins 31 and be supported between the first nuts 36 and the cylinder. Thus, there would be no need for the second pins. In addition to the pressure springs, the second springs can be comprise of spring such as plate springs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A coupling:
   a first coupling element and a second coupling element arranged so as to be rotatable relative to one another around an axis of rotation;
   a friction assembly being switchable to a torque transmitting position to transmit torque from one of said first and second coupling elements to the other coupling elements;
   an actuating element axially displaceable relative to the first coupling element between a switched-on position and a switched-off position, in the switched-on position, the friction assembly is loaded to assume the torque transmitting position;
   a power drive for actively displacing the actuating element, said power drive actively loads the actuating element into the switched-on position against an abutment mechanism, said abutment mechanism delimits the displacement path of the actuating element and maintains said actuating element in the switched-on position;
   a first spring mechanism which, in the switched-on position of the actuating element, loads the friction assembly with force to enable the friction assembly to assume the torque transmitting position and said first spring mechanism is pretensioned by the actuating element by a pretensioned path defined by the switched-on position of the actuating element.

2. A coupling according to claim 1, wherein in the switched-on position of the actuating element, the first spring mechanism is supported against the actuating element and against the friction assembly.

3. A coupling according to claim 1, wherein the power drive is in the form of a hydraulically acting switching unit having a first switching element, which forms part of the actuating element, and a second switching element, which is firmly connected to the first coupling element, said first and second switching elements form a unit, and said first switching element and the second switching element jointly form a pressure chamber.

4. A coupling according to claim 3, wherein the first switching element is in the form of a piston and the second switching element is in the form of a cylinder.

5. A coupling according to claim 3, wherein the pressure chamber is arranged centrally relative to the axis of rotation.

6. A coupling according to claim 1, wherein the abutment mechanism is adjustable so that the switched-on position of the actuating element and thus the pretensioned path of the first spring mechanism can be varied.

7. A coupling according to claims 1, wherein the abutment mechanism is in the form of pins which extend parallel to the axis of rotation, a first end of said pins is connected to the actuating element and, in the switched-on position of the actuating element, a second end of the pins is axially at least indirectly supported against the first coupling element.

8. A coupling according to claim 7, wherein nuts are included for varying the axial position of the switched-on position, said nuts are screwed onto a thread at the second end of the pins and via said nuts the pins are supported against the first coupling element.

9. A coupling according to claim 1, further comprising a returning mechanism which loads the actuating element to enable the actuating element to assume the switched-off position.

10. A coupling according to claim 9, wherein the returning mechanism is in the form of pins which extend parallel to the axis of rotation, a first end of the pins is connected to the actuating element and, in the switched-on position of the actuating element, by a second end of the pins is, the return mechanism is axially supported via a second spring against the first coupling element.

11. The coupling according to claim 10, wherein the returning mechanism at the same time forms the abutment mechanism.

12. The coupling according to claim 1, wherein the first coupling element is in the form of a coupling sleeve and the second coupling element is in the form of a coupling hub.

13. The coupling according to claim 1, wherein the friction assembly includes first plates which are supported against the first coupling element in a rotationally fast way or are connected to the first coupling element in a rotationally fast way, and second plates supported against the second coupling element in a rotationally fast way or connected thereto in a rotationally fast way.

14. The coupling according to claim 1, wherein the first spring is in the form of at least one plate spring.

* * * * *